(12) United States Patent
Giesler et al.

(10) Patent No.: US 7,226,671 B2
(45) Date of Patent: Jun. 5, 2007

(54) USE OF POWDER METAL SINTERING/DIFFUSION BONDING TO ENABLE APPLYING SILICON CARBIDE OR RHENIUM ALLOYS TO FACE SEAL ROTORS

(75) Inventors: William L. Giesler, Phoenix, AZ (US); Robbie J. Adams, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 20 days.

(21) Appl. No.: 11/075,586

(22) Filed: Mar. 9, 2005

(65) Prior Publication Data
US 2005/0175840 A1 Aug. 11, 2005

Related U.S. Application Data

(60) Division of application No. 10/439,637, filed on May 15, 2003, now Pat. No. 6,946,096, and a continuation-in-part of application No. 10/138,090, filed on May 3, 2002, now Pat. No. 6,773,663, and a continuation-in-part of application No. 10/138,087, filed on May 3, 2002, now Pat. No. 6,749,803.

(60) Provisional application No. 60/384,631, filed on May 31, 2002.

(51) Int. Cl.
*B32B 15/04* (2006.01)
*B32B 15/18* (2006.01)
*B32B 5/18* (2006.01)

(52) U.S. Cl. ............... 428/698; 428/655; 428/405; 428/539.5

(58) Field of Classification Search ............... None
See application file for complete search history.

(56) References Cited

U.S. PATENT DOCUMENTS 2,467,675 A 4/1949 Kurtz et al.

(Continued)

FOREIGN PATENT DOCUMENTS

DE 24 33 814 A1 1/1976

(Continued)

OTHER PUBLICATIONS

*Kennametal Metallurgical Products, Matrix Powders information sheet*, www.kennametal.com.

(Continued)

*Primary Examiner*—John J. Zimmerman
*Assistant Examiner*—Jason L. Savage
(74) *Attorney, Agent, or Firm*—Ingrassia Fisher & Lorenz

(57) ABSTRACT

A method for making aerospace face seal rotors reinforced by rhenium metal, alloy, or composite in combination with silicon carbide or other ceramic. The resulting rotor also is disclosed. Ceramic grains, preferably silicon carbide (SiC), are mixed with powdered metallic (PM) binder that may be based on a refractory metal, preferably rhenium. The mixture is applied to a rotor substrate. The combined ceramic-metal powder mixture is heated to sintering temperature under pressure to enable fusion of the ceramic in the resulting metal-based substrate. A load may then be applied under an elevated temperature. The resulting coated rotor can exhibit high hot hardness, increased durability and/or high hot wear resistance, as well as high thermal conductivity.

14 Claims, 1 Drawing Sheet

U.S. PATENT DOCUMENTS

| | | | |
|---|---|---|---|
| 3,378,392 A | | 4/1968 | Longo |
| 3,594,011 A | * | 7/1971 | Haller .................. 277/399 |
| 3,969,186 A | | 7/1976 | Thompson et al. |
| 4,048,382 A | * | 9/1977 | Fengler .................. 428/651 |
| 4,067,742 A | | 1/1978 | Fletcher et al. |
| 4,119,458 A | | 10/1978 | Moore |
| 4,155,660 A | | 5/1979 | Takahashi et al. |
| 4,380,471 A | | 4/1983 | Lee et al. |
| 4,432,794 A | | 2/1984 | Holleck |
| 4,764,225 A | | 8/1988 | Shankar et al. |
| 4,915,733 A | | 4/1990 | Schutz et al. |
| 4,927,798 A | | 5/1990 | Baldi |
| 4,985,051 A | | 1/1991 | Ringwood |
| 5,262,202 A | | 11/1993 | Garg et al. |
| 5,476,531 A | | 12/1995 | Timm et al. |
| 5,577,263 A | | 11/1996 | West |
| 5,704,538 A | | 1/1998 | Mittendorf |
| 5,707,567 A | * | 1/1998 | Pfaff .................. 264/29.7 |
| 5,722,034 A | | 2/1998 | Kambara |
| 5,730,792 A | | 3/1998 | Camilletti et al. |
| 5,745,834 A | | 4/1998 | Bampton et al. |
| 5,824,425 A | | 10/1998 | Mitttendorf |
| 5,853,904 A | | 12/1998 | Hall et al. |
| 5,928,799 A | | 7/1999 | Sherman et al. |
| 5,993,980 A | | 11/1999 | Schmitz et al. |
| 6,039,920 A | | 3/2000 | Koch et al. |
| 6,127,047 A | | 10/2000 | Worrell et al. |
| 6,200,524 B1 | * | 3/2001 | Griskin et al. .................. 419/8 |
| 6,203,752 B1 | | 3/2001 | Bewlay et al. |
| 6,284,357 B1 | | 9/2001 | Lackey et al. |
| 6,338,906 B1 | * | 1/2002 | Ritland et al. ........... 428/539.5 |
| 6,412,784 B1 | * | 7/2002 | Cohen .................. 277/385 |
| 6,655,695 B1 | * | 12/2003 | Sund et al. .................. 277/404 |
| 2003/0223903 A1 | * | 12/2003 | Adams .................. 420/433 |

FOREIGN PATENT DOCUMENTS

| | | |
|---|---|---|
| EP | 0 453 303 A1 | 10/1991 |
| EP | 1 123 908 A1 | 8/2001 |
| SU | 1804141 | 5/1996 |
| WO | WO 01 35006 A2 | 5/2001 |
| WO | PCT/US03/17118 | 10/2003 |

OTHER PUBLICATIONS

*Ultramet, Silicon carbide information sheet*, www.ultramet.com.
*Heat treatment, Nitriding information sheet.*
*Danish Technological Institute, PVD Coatings*, www.tribology.dti.dk.
*Accuratus, Sialon information sheet*, www.accuratus.com.

\* cited by examiner

USE OF POWDER METAL SINTERING/DIFFUSION BONDING TO ENABLE APPLYING SILICON CARBIDE OR RHENIUM ALLOYS TO FACE SEAL ROTORS

CROSS-REFERENCES TO RELATED APPLICATIONS

This patent application is related to and priority is claimed to: U.S. Provisional Application Ser. No. 60/384,631 filed May 31, 2002 for Use of Powdered Metal Sintering/Diffusion Bonding to Enable Applying Silicon Carbide or Rhenium Alloys to Face Seal Rotors. This application is also a continuation-in-part of U.S. patent application Ser. No. 10/138,090 filed May 3, 2002 for Oxidation and Wear Resistant Rhenium Metal Matrix Composite now U.S. Pat. No. 6,773,663 and U.S. patent application Ser. No. 10/138,087 filed May 3, 2002 for Oxidation Resistant Rhenium Alloys now U.S. Pat. No. 6,749,803 which applications are all incorporated by reference.

This patent application incorporates the following patent applications by reference but claims no priority to any of them: U.S. Provisional Application 60/384,737 filed on May 31, 2002 for Reduced Temperature And Pressure Powder Metallurgy Process For Consolidating Rhenium Alloys; and U.S. patent application Ser. No. 10/243,445 filed Sep. 13, 2002 for Reduced Temperature and Pressure Powder Metallurgy Process for Consolidating Rhenium Alloys now U.S. Pat. No. 6,821,313. All the foregoing applications are incorporated by reference, but this application does not claim priority to any of the foregoing applications.

This application is a divisional of Ser. No. 10/439,637 filed on May 15, 2003 now U.S. Pat. No. 6,946,096.

COPYRIGHT AUTHORIZATION

A portion of the disclosure of this patent document may contain material which is subject to copyright protection. The copyright owner has no objection to the facsimile reproduction by any one of the patent disclosure as it appears in the U.S. Patent and Trademark Office patent files or records, but otherwise reserves all copyright rights whatsoever.

BACKGROUND OF THE INVENTION

1. Field of the Invention

This invention relates to the use of powdered metal sintering or diffusion bonding to enable silicon carbide and/or rhenium alloys to coat face seal rotors, such as face seal rotors found in air turbine starter components for gas turbine engines found in aircraft or other applications.

2. Description of the Related Art

Mechanical face seals in aerospace applications operate at high rotary speeds and need high thermal conductivity rotor materials to reduce running temperatures. Aerospace face seals typically can include a metal-based disc, called a rotor, with a very flat face. Such face seals rotate while in contact or nearly in contact with a stationary, very flat carbon disc, called a stator.

Currently, one material with a high thermal conductivity typically used for rotors is silicon carbide (SiC). Silicon carbide has long been recognized as an ideal material for applications where superior attributes such as hardness and stiffness, strength and oxidation-resistance at elevated temperatures, high thermal conductivity, low coefficient of thermal expansion, and resistance to wear and abrasion are of primary value. The resiliency and utility of silicon carbide are well established in the art and silicon carbide parts are often fabricated by powder metallurgy (PM) and chemical vapor deposition (CVD). Wide use of monolithic SiC in low speed industrial equipment is acknowledgement within the seal industry that it is the "best of class" seal rotor material.

However, monolithic silicon carbide (SiC) can be brittle and is generally not used in some aerospace equipment when there are higher rotation speeds and stresses. In addition, conventional techniques of coating steel seal rotors with particulate ceramics are not capable of applying SiC because its melting and/or oxidation temperature can be exceeded by such techniques. Conventional techniques for coating steel seal rotors with ceramic include plasma spraying, high velocity oxygen fuel (HVOF), and detonation gun systems. Furthermore, fabrication of monolithic ceramics is expensive. They are difficult to machine and are susceptible to fracture as they are very notch sensitive.

Some high-speed aerospace seal applications have higher-than-preferred carbon temperatures at the rotor/stator interface. These higher temperatures can reduce the life of both the carbon stator and the face seal assembly. Although existing designs are safe and reliable, sometimes the carbon stator may fail unexpectedly and the component in which it operates, usually a gas turbine engine starter, must be replaced or repaired. Other components using carbon stators include primary propulsion aircraft engines, engine gearbox seals, engine accessories such as air turbine starters, hydraulic pumps, generators, constant speed drives, and permanent magnet alternators which must be replaced when the face seal fails. Such unplanned replacements or repairs are expensive, cause unit downtime, and increase operating costs.

In view of the foregoing disadvantages, there is a need for an improved aerospace face seal rotor that is able to better withstand the operating temperatures of aerospace applications. The present invention solves one or more of these disadvantages and satisfies a need for a better face seal and related rotor components.

SUMMARY OF THE INVENTION

In view of the foregoing disadvantages, the present invention provides a new and better face seal and rotor component that can withstand higher temperatures and stresses to provide better operation. In particular, a high thermal conductivity material is given additional strength and resiliency by combination with sintered metal or metal alloy. Silicon carbide (SiC) may be used as the material with high thermal conductivity while a refractory metal or metal alloy (such as one based on rhenium) may be used as the metal/metal alloy for sintering.

The specific powdered metal compound planned for encapsulating the SiC may be a rhenium alloy optimized for oxidation resistance such as that of U.S. patent application Ser. No. 10/138,090 and Ser. No. 10/138,087 referred to above. The use of rhenium can add high toughness to the coating and high hot wear resistance to complement the high hot hardness and high hot wear resistance of the SiC.

Set forth herein are new methods by which improved face seal rotors can be achieved by following the method described herein for manufacturing such face seal rotors. Powdered ceramic and powdered metal are mixed and applied to a rotor substrate. The resulting mixture is then heated to a sintering temperature of the mixture while simultaneously applying a load upon the mixture. The coating then bonds to the substrate to provide an exposed contact surface for the rotor. The resulting rotor substrate is then able to withstand better the stresses arising from use and operates as a face seal as the powdered ceramic and powdered metal mixture provides a face to the rotor that performs better under operating conditions. The rotor substrate may be steel or an alloy thereof while the powdered ceramic may be silicon carbide or a variety of other materials. The powdered metal may be a refractory metal-based material that has been rendered into powdered form for mixing with the powdered ceramic. Rhenium and alloys thereof are some such refractory materials which have been used to good advantage and which may be used exclusively in one alternative embodiment.

In another embodiment, the invention relates to an improved aerospace face seal rotor having improved wear and performance characteristics as the face of the rotor creating the seal is better able to withstand the physical and thermal stresses of operation by the incorporation of improved-wear materials.

Other features and advantages of the present invention will become apparent from the following description of the preferred embodiment(s), taken in conjunction with the accompanying drawings, which illustrate, by way of example, the principles of the invention.

DESCRIPTION OF THE PREFERRED EMBODIMENT(S)

Figure 1:
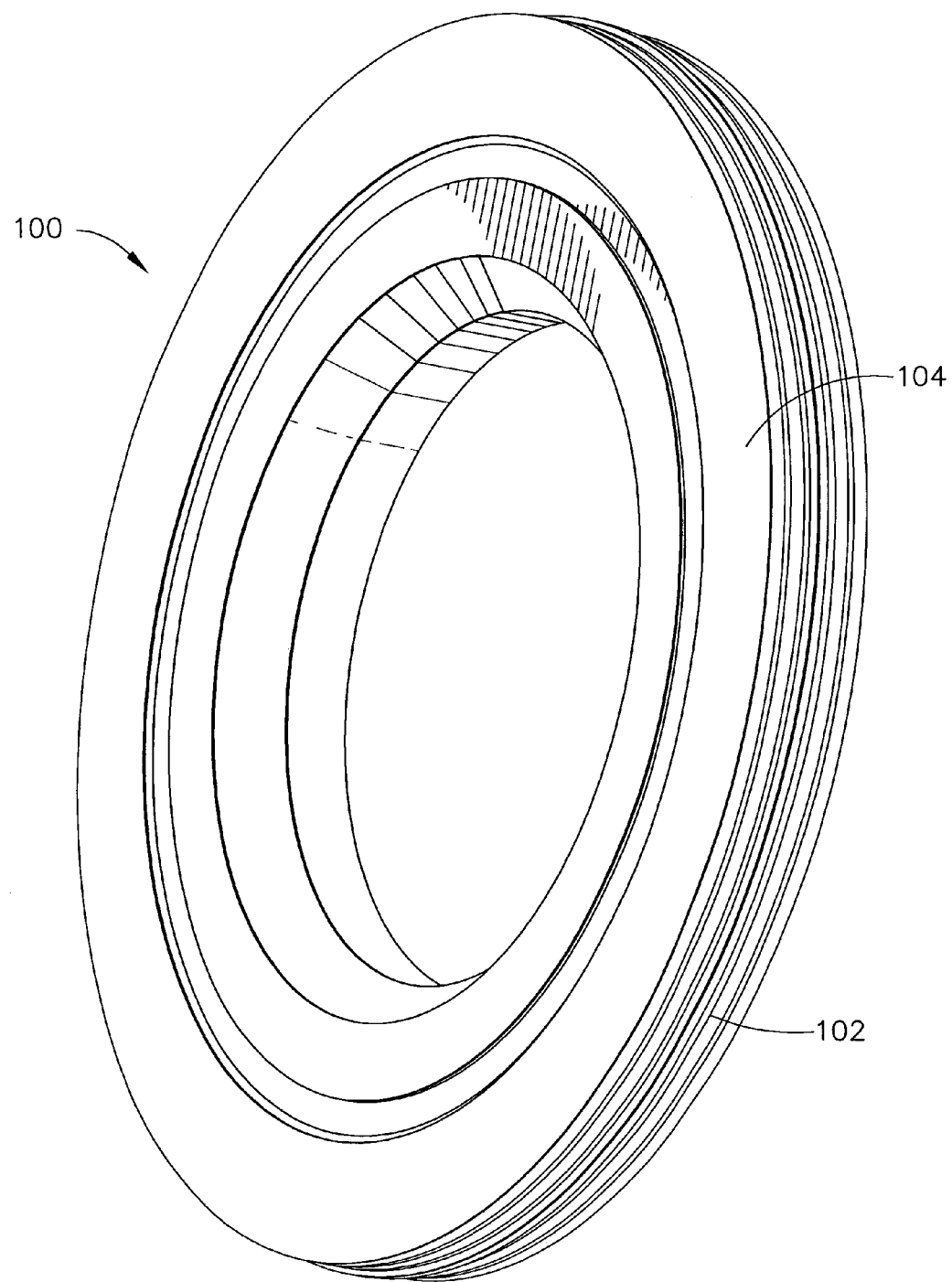
FIG. 1 is a face seal rotor of the kind described herein of the kind having the improved face of powdered ceramic and powdered metal.

The detailed description set forth below in connection with the appended drawings (if any) is intended as a description of presently-preferred embodiments of the invention and does not represent the only forms in which the present invention, materials, and/or processes may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

As shown in FIG. 1, face seal rotor 100 may have a substrate 102 that provides support for a face 104. The face 104 provides one half of a seal (in conjunction with a stator, not shown). The face is where friction may develop and heat and stress may occur. The face 104 provides the operating surface for the resulting seal and is of great concern as it is where the seal must hold in order to prevent communication between the inside of the seal and the outside of the seal.

Rhenium and rhenium alloys generally have low thermal expansion coefficients in contrast to typical metals and, therefore, maintain thermal bonds with the low thermal expansion rate SiC after sintering better than typical metals. The low yield strength of annealed rhenium alloy also could enable hot isostatic processing (HIPing) to yield the rhenium and thereby improve contact between the rhenium and the SiC. Improved contact could further increase the thermal conductivity of the resulting coating. The materials and processes invention set forth herein include the use of powdered metal sintering/diffusion bonding to enable application of silicon carbide, SiC, to the face of a steel seal rotor.

Use of powder metallurgy techniques eliminates high temperature melting and oxidation problems described as set forth herein and as such problems are known in the art.

In one embodiment, silicon carbide (SiC) grains are mixed with a powdered metallic (PM) binder to create a new composite that in a preferred embodiment is applied to a substrate. Rhenium and/or rhenium alloys are preferred matrix materials due to their high ductility, resulting in a tough, wear-resistant coating. The diffusion/bonding temperature of such rhenium-base materials is significantly below the temperature of conventional coating processes, therefore the sintering temperature is below the rotor substrate (i.e., steel) melting point, and does not affect the embedded SiC.

In a preferred substrate coating approach, the metal powder and SiC particles are mixed in specific quantities, placed on the surface of the rotor substrate, and heated to the sintering temperature. A load is then applied with the entire rotor assembly held at temperature for a suitable time with the load. The temperature at which the material is under load can be varied, such as raising or lowering the temperature to promote or retard sintering. Sintering with rhenium and/or related alloys generally occurs below the melting point of rhenium, approximately, 3453° K (5756° F., 3180° C.). The load can be applied by using a ram. Hot isostatic pressing (HIP) is considered to be a good candidate for applying the load. When subjecting the proto-rotor with the improved face to HIP, the part to be subject to HIP is surrounded with an appropriate foil and placed in an electron beam welding vacuum chamber. The foil is then sealed using electron beam welding. The assembly is then placed in a high-pressure furnace to apply both pressure and temperature to the rotor assembly.

The load can generally be applied at any time during the process either before or during sintering or heating of the proto-rotor. The load may be applied and removed in increments. The load can generally be removed at any time after sintering once the sintering operation is complete. Currently, the preferred method is to apply a small preload of approximately 100 pounds during the heating of the proto-rotor to sintering temperature. The full load is then applied once the sintering temperature has been reached. It is currently believed that this gives the proto-rotor with its mixture an opportunity to drive off some of the oxides and moisture present on or in the metal and/or ceramic powders during the 100 pound load condition before applying the full load.

Once sintering has taken place, the assembly may then be cooled. Upon cooling, the now-coated rotor may be removed and finished for use in a face seal. The assembly is then cooled and the coated rotor removed.

A variation of this approach may include raising the temperature to a point where annealing, or softening, of the PM materials takes place. The annealing step may occur immediately after sintering and removal of load or it may be conducted as an entirely separate step. An intermediate coating between the Re/SiC alloy and the substrate may be employed to improve the interface properties between the rotor substrate and the composite coating.

An alternative to the above coating approach is to bond a thin composite disc to a substrate. The rhenium alloy PM with SiC particles may be first created in the form of a thin disc within a non-reactive mold then, in a later step, it is brazed or bonded to a substrate of interest. Yet another alternative is to create a complete rotor from the rhenium (Re) alloy/SiC mixture. The same PM/sinter steps as just noted would be followed except there is no substrate as the rotor is made entirely of the PM-SiC material. Alternatively, the rotor may be a pure rhenium or rhenium alloy disk.

The use of rhenium (Re) for powdered metal sintering/diffusion bonding is preferred, and may include, but is not limited to, rhenium (Re) or rhenium-based alloys. Other alloys, metals, or materials can also be used that preferably have high hot hardness, significant ductility, and high thermal conductivity. Cobalt, nickel, beryllium copper (BeCu), high strength bronzes and brasses, chrome, and chrome nickel alloys are all possible binder metals and/or coating substrates when using a powdered metal approach to encapsulate ceramic at the running surface of a face seal rotor. Also, the rhenium (Re) alloy can be used by itself as it has good thermal conductivity, ductility, and high hot hardness on its own. It is understood that the examples set forth herein are not intended to limit the materials subject to incorporation into the present system.

The ceramic encapsulated is not limited to silicon carbide, SiC. Any high thermal conductivity ceramic or equivalent material will enhance the life of a contacting face seal. The ceramics that are of known interest in addition to reaction bonded and sintered SiC are silicon nitride (SiN), reaction bonded and sintered WC (tungsten carbide) and beryllium oxide (BeO). These are primary ones known in the industry experience and are noted here in particular. Noted also are single isotope ceramics, such as silicon 28 which appears to be commercially available in the near future with a 60% increase in thermal conductivity versus mixed isotopes.

Additionally, alloys of silicon nitride and aluminum oxide, alumina, alumina titanate, aluminum nitride, beryllium oxide (BeO), boron nitride, braided ceramic fibers, bronze powder, carbide/cobalt hardmetal, carbonyl iron, carbonyl iron powder, carbonyl nickel, carbonyl nickel powder, cast carbide, ceramic eutectic composites, coarse-grained tungsten, cobalt, cobalt oxide, conventional carburized tungsten carbide (WC), copper, copper powder, diamond, entatite, fosterite, fusion bonds, hot-press matrices, infiltration matrices, macrocrystalline tungsten carbide powder, metal matrix composites, nickel oxide, niobium carbide powder, PCBN (polycrystalline cubic boron nitride), PCD (polycrystalline diamond), physical vapor deposition (PVD) coatings, reaction bonded silicon nitride, reaction bonded tungsten carbide (WC), reaction bonded tungsten carbide and sintered tungsten carbide (WC), SiAlON (silicon aluminum oxynitride), SiC whisker-reinforced alumina ceramic, silica zirconia, silicon nitride, sintered tungsten carbide (WC), steel, steel powder, superhard and other PCD and PCBN product extensions, superhard and other diamond and CBN (cubic boron nitride) coatings, superhard-coated and other material-coated silicon nitride, tantalum carbide powder, tantalum niobium carbide powder, tin, tin powder, titanium carbide (TiC), titanium carbide-titanium nitride-(TiC—TiN) based carbide and ceramic substrates, titanium carbide-titanium nitride TiC—TiN, titanium carbonitride powder, titanium diboride, titanium nitride powder, tungsten carbide macrocrystalline tungsten carbide (WC), tungsten metal powder, tungsten titanium carbide powder, zinc powder, zirconia, and mixtures thereof are specific ceramic materials that may not have been used previously for seals in conjunction with a powdered metal but might be possible to use with the right system. Many potential candidates are known in the art as powdered metal ceramic composites that have been used previously for seal rotors. Such materials may have been used as a single piece instead of as just a local surface coating.

Encapsulating SiC (silicon carbide) in a sintered rhenium powdered metal alloy has several advantages including those already mentioned. The sintering temperature of the powdered metal (PM) is low enough not to vaporize the SiC. Such vaporization is a problem in plasma spray, high velocity oxygen fuel (HVOF), and detonation gun spray deposit systems. The particle size of the SiC can be selected to minimize the thermal and rotational stresses in the SiC. In fact, the alloy/particle size can be tailored to have different properties for each application. The powdered metal (PM) can create a tough, crack-resistant composite, even though it contains a brittle component. This may prevent brittle fractures due to handling mishaps. The powdered metal can be applied as a coating onto lower cost, high experience, rotor metals. This can reduce costs and the risk that the material would fracture in service. The use of this or a similar coating allows mechanical bonding between the coating and the rotor including (but not limited to) cutting a dovetail thread in the rotor surface to ensure retention of the coating. Other mechanical bonding approaches include grit blasting the rotor substrate, cutting a thread in the rotor substrate, and cutting a sawtooth thread in the rotor substrate, among others.

Alternatively, chemical bonding can be used to fix or attach the coating to the rotor substrate. Such chemical bonding may include the use of rotor plating to adhere the coating to the rotor substrate. Nickel plating, chrome plating, cobalt plating and copper plating are a few examples of plating for chemical bonding purposes. Other means by which the coating may be attached to the rotor substrate are within the contemplation of the current system.

Toughness and the ability to apply a coating require additional emphasis due to their unique advantages. The use of a coating reduces the volume of material that is ceramic or metal matrix encapsulated ceramic (metal matrix composite). This reduces the cost of the rotor. Solid or monolithic ceramic rings are expensive to machine and very sensitive to machining flaws. Ceramic particles (in the form of dust or otherwise) are added to the powdered metal so that machining of complete monolithic ceramic shapes is not required. The local coating can be applied to a high strength, high ductility (high toughness) steel. This reduces the risk of a fracture and subsequent structural failure that can arise from an entire rotor of solid or monolithic ceramic or some metal matrix composite. Technical risk of component failure is reduced as the high centrifugal loads in aerospace applications are supported by the high toughness steel substrate. The steel substrate provides the toughness. The coating supplies the high thermal conductivity and hot hardness of the ceramic.

Additional enhancement of the seal rotor's thermal conductivity is possible by selection of a high thermal conductivity steel alloy not typically used for seal rotors for use as the rotor substrate. Nitriding grade steels such as 135M, Nitralloy 135M, Nitralloy EZ, and Nitralloy N135M have significantly higher (a 50% increase) in thermal conductivity than standard seal rotor steel alloys due to the addition of aluminum to the alloy to improve nitriding properties. Other thermally conductive and resilient materials may also be used for rotor substrate manufacture.

High thermal conductivity substrate steels such as Nitralloy G, 135M, SAE 7140, AMS 6470, N or AMS 6475, and EZ are a subset of known industry steels with increased amounts of aluminum. Industry uses the increased aluminum content in such steels to improve the response of the steel to nitriding. The increased aluminum content also results in increased thermal conductivity of the steel which is a significant benefit for carbon face seal rotors. This thermal facet may be a new discovery. Increased thermal conductivity of the seal rotor substrate has two primary advantages:

One is the reduced running temperature of the carbon ring running against the seal rotor. The seal coke life increases by a factor of two for every 25 degrees F. (25° F.) reduction of the carbon ring temperature. The 50% increase in thermal conductivity of the aluminum containing steels is therefore a significant advantage.

The second advantage is the reduction in thermal distortion of the seal rotor due to the increased thermal conductivity of the aluminum containing steels. Rotor distortion due to the temperature gradient from the carbon contact face to the bulk rotor temperature is a significant problem in aerospace high speed seals. The 50% increase in thermal conductivity of the aluminum—containing steels results in almost a 50% decrease in the predicted rotor distortion at operation. This is a significant advantage for aerospace high speed seals.

The published composition of Nitralloy steels are as follows:

|  | C | Mn | Si | Cr | Ni | Mo | Al | Other | SAE | AMS |
|---|---|---|---|---|---|---|---|---|---|---|
| Nitralloy G | 0.35 | 0.55 | 0.30 | 1.2 | — | 0.20 | 1.0 | — | — | — |
| Nitralloy 135M | 0.42 | 0.55 | 0.30 | 1.6 | — | 0.38 | 1.0 | — | 7140 | 6470 |
| Nitralloy N | 0.35 | 0.55 | 0.30 | 1.18 | 3.5 | 0.25 | 1.0 | — | — | 6475 |
| Nitralloy EZ | 0.35 | 0.80 | 0.30 | 1.25 | — | 0.20 | 1.0 | 0.2Se | — | — |

Other standard steels have maximum aluminum content of 0.10%. These substrate materials as well as steels with aluminum content approximately equal to or higher than 0.11% provide excellent wear characteristics when used as a seal rotor as do the standard nitriding industry grades of steel.

In an alternative embodiment, a solid rhenium or rhenium alloy-based seal ring may be used in a face seal rotor. Additionally, high thermal-conductivity steels that include aluminum as a constituent are exemplary, and possibly preferred, substrates. Such substrates provide thermally compatible structural supports for coating systems, including chrome plating and PVD systems, to enable better face seal performance.

With respect to PVD coatings, standard PVD coatings include titanium nitride (TiN), chromium nitride (CrN), titanium carbonitride (TiCN), multi-layered titanium nitride and carbonitride coatings (TiN(C,N)), titanium aluminum nitride (TiAlN), aluminum titanium nitride (AlTiN), multi-layered titanium aluminum and nitride coatings ((Ti,Al)N). Other coatings may also be used so long as they have sufficient thermal and wear characteristics to endure the conditions present in an operating face seal rotor. Similar coatings or other ones applied by CVD may also be put to advantageous use.

PVD titanium nitride coatings have been widely used as the gold color coated drill bits available commercially in retail establishments. The coatings are widely used in machine tool cutting inserts to advantageously provide lower wear rates, lower friction, and high hot hardness during the cutting of metals. These properties are also advantages when put to use in carbon face seal and/or rotor coatings. Physical vapor deposition systems are typically the preferred method used to apply the coatings because the resulting temperatures applied to the rotor substrate is lower which reduces thermal effects and stress upon the rotor substrate metal.

The use of multi-layered coatings in the present system is designed to minimize dissimilar thermal expansion of the coating which allows a thicker coating layer to be applied while minimizing or inhibiting thermal stress induced failures at high temperature. While there are many multi-layered PVD coatings that may be used in the present system, PVD-deposited molybdenum disulfide ($MoS_2$) with or without alloying elements and PVD-deposited zirconium nitride (ZrN) and its derivative zirconium carbonitride Zr(C, N) may be used to good effect.

While the present invention has been described with reference to a preferred embodiment or to particular embodiments, it will be understood that various changes and additional variations may be made and equivalents may be substituted for elements thereof without departing from the scope of the invention or the inventive concept thereof. In addition, many modifications may be made to adapt a particular situation or material to the teachings of the invention without departing from the essential scope thereof. Therefore, it is intended that the invention not be limited to particular embodiments disclosed herein for carrying it out, but that the invention includes all embodiments falling within the scope of the appended claims.

What is claimed is:

1. A face rotor seal, comprising:
   a rotor substrate of steel; and
   a composite coating on a face of the rotor substrate, the composite coating being a mixture of ceramic and a rhenium-base material.

2. A face rotor seal as set forth in claim 1, wherein the composite coating further comprises:
   a sintered composite coating on a face of the rotor substrate.

3. A face rotor seal as set forth in claim 1, further comprising:
   the composite coating being a mixture of silicon carbide and the rhenium-base material.

4. A face rotor seal as set forth in claim 1, further comprising:
   the ceramic selected from the group consisting of alumina, alumina titanate, aluminum nitride, and mixtures thereof, beryllium oxide, boron nitride, braided ceramic fibers, carbide/cobalt hardmetal, cast carbide, ceramic eutectic composites, coarse-grained tungsten, coated silicon nitride, cobalt oxide, conventional carburized tungsten carbide, diamond, entatite, fosterite, hot-press matrices, infiltration matrices, macrocrystalline tungsten carbide powder, macrocrystalline tungsten carbide sintered tungsten, metal matrix composites, multi-layered PVD coatings, nickel oxide, niobium carbide powder, physical vapor deposition coatings, reaction bonded silicon nitride, reaction bonded tungsten carbide, reaction bonded tungsten carbide and sintered tungsten carbide, silica zirconia, silicon carbide whiskers, silicon carbide fibers, silicon carbide whisker-reinforced alumina ceramic, silicon nitride, sintered tungsten carbide, tantalum carbide powder, tantalum niobium carbide powder, titanium carbide, titanium carbide-titanium nitride, titanium carbide-titanium nitride-based carbide and ceramic substrates, titanium carbide-titanium nitride-based carbide substrates, titanium carbide-titanium nitride-based ceramic substrates, titanium carbonitride powder, titanium diboride, titanium nitride powder, tungsten carbide macrocrystalline tungsten carbide, tungsten disulfide, tungsten metal powder, tungsten sulfide, tungsten titanium carbide powder, zirconia, and mixtures thereof.

5. A face rotor seal as set forth in claim 1, wherein the ceramic further comprises silicon carbide (SiC).

6. A face rotor seal as set forth in claim 1, wherein the rotor substrate further comprises an aluminum alloy of steel.

7. A face rotor seal as set forth in claim 6, wherein the rotor substrate further comprises aluminum alloys of steel selected from the group consisting of 135M, Nitralloy 135M, Nitralloy EZ, Nitralloy G, Nitralloy N, SAE 7140, AMS 6470, AMS 6475, Nitralloy N135M, thermally conductive steels, and steels having at least 0.011% by weight of aluminum.

8. A face rotor seal as set forth in claim 1, wherein the composite coating is mechanically bonded to the rotor substrate to provide enhanced retention of the composite coating formed by the rotor substrate.

9. A face rotor seal as set forth in claim 8, wherein the composite coating is mechanically bonded to the rotor substrate to provide enhanced retention of the composite coating formed by the rotor substrate by operations selected from the group consisting of:

cutting a dovetail thread in the rotor substrate;
grit blasting the rotor substrate;
cutting a thread in the rotor substrate; and
cutting a sawtooth thread in the rotor substrate.

10. A face rotor seal as set forth in claim 1, further comprising:
the composite coating chemically bonded to the rotor substrate.

11. A face rotor seal as set forth in claim 10, further comprising:
enhancing retention of the composite coating to the rotor substrate by plating with elements selected from the group consisting of nickel, chromium, cobalt, zirconium, vanadium, titanium, tantalum, silicon, scandium, rhodium, platinum, palladium, osmium, columbium, molybdenum, manganese, iridium, hafnium, iron, chromium, beryllium, and boron.

12. A face rotor seal, comprising
a steel rotor substrate; and
a composite coating coupled to a face of the rotor substrate, the composite coating being a mixture of silicon carbide and rhenium-base material.

13. A face rotor seal as set forth in claim 12, wherein the composite coating further comprises:
a sintered composite coating on a face of the rotor substrate.

14. A face rotor seal, comprising:
a rotor substrate including steel; and
a sintered composite coating coupled to a face of the rotor substrate, the composite coating being a mixture of ceramic and refractory materials including silicon carbide and rhenium-base material, respectively.

* * * * *